March 24, 1931.   R. McC. HALBACH   1,798,083
HEADLIGHT
Filed March 29, 1929   2 Sheets-Sheet 1
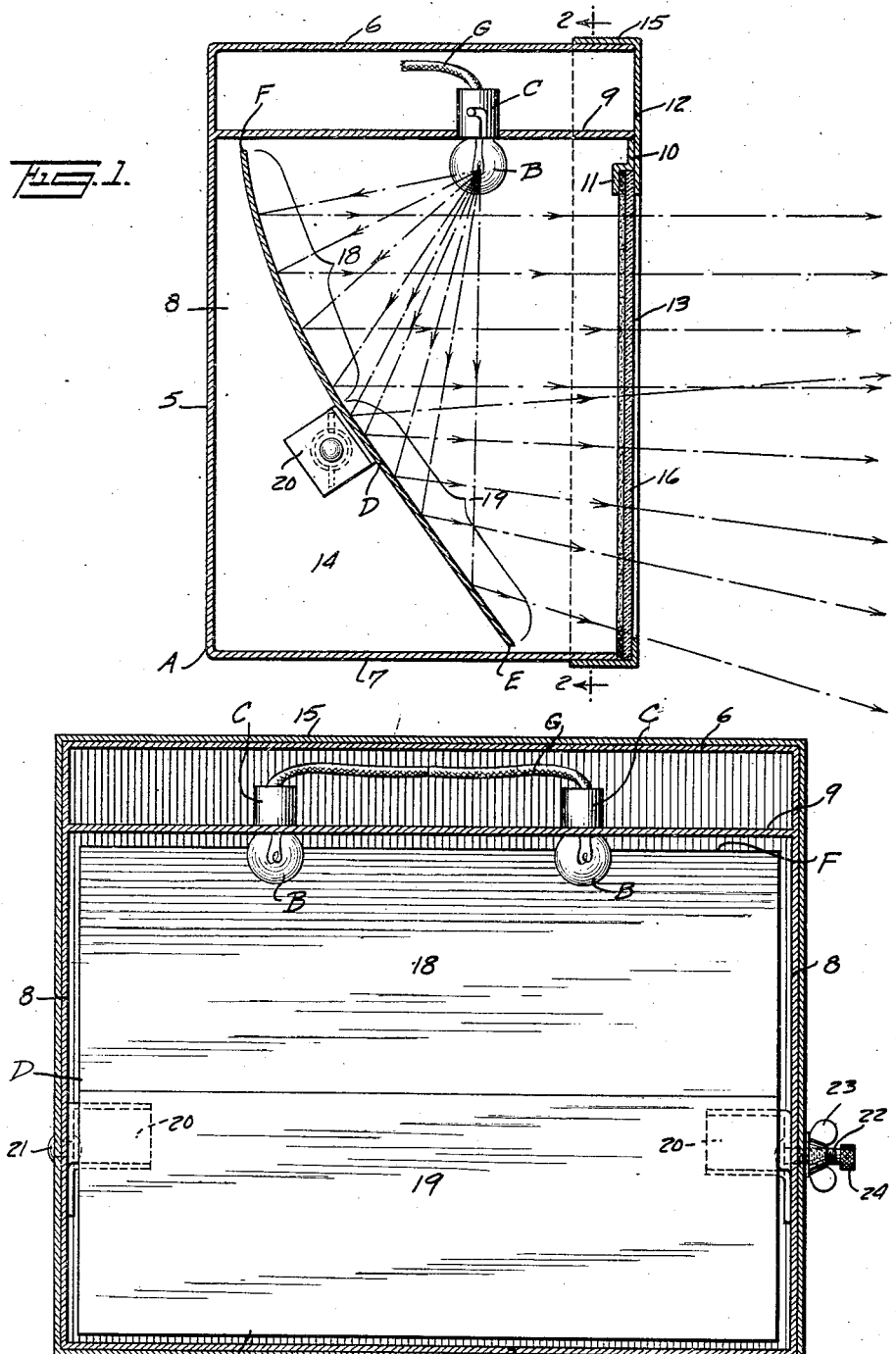
WITNESSES
R. Scavuzzo
Hugh H. Ott
INVENTOR
Robert McCulley Halbach
BY
ATTORNEY March 24, 1931.                R. McC. HALBACH                1,798,083
                                  HEADLIGHT
                        Filed March 29, 1929    2 Sheets-Sheet 2

WITNESSES
R. Scavizzo
Hugh H. Ott

INVENTOR
Robert McCulley Halbach
BY
ATTORNEY

Patented Mar. 24, 1931

1,798,083

UNITED STATES PATENT OFFICE

ROBERT McCULLEY HALBACH, OF LAKEWOOD, NEW JERSEY

HEADLIGHT

Application filed March 29, 1929. Serial No. 351,039.

This invention relates to headlights, and has particular reference to a headlight which is principally designed for use on road vehicles.

Primarily, the invention comprehends a headlight which functions to illuminate the roadway in advance of the vehicle without subjecting the eyes of the drivers of approaching vehicles or pedestrians to a blinding glare.

More particularly, the invention contemplates a headlight equipped with a reflector which is so constructed as to reflect and diffuse the light rays from a source of illumination and flood the roadway without subjecting the eyes of the drivers of approaching vehicles or pedestrians to a direct reflection of the source of illumination.

More specifically, the invention comprehends a reflector, the lower portion of which is a plane or flat surface and the upper portion of which is on a curve which is the segment of a parabola whereby the parabolic upper section serves to direct a portion of the light rays reflected in a plane substantially parallel with the roadway while the lower flat surface disposed at an inclination radiates the light rays therefrom and floods the roadway directly in advance of the vehicle.

The invention furthermore comprehends in a headlight for road vehicles, a casing having a light outlet opening with a lamp mounted in the upper portion of the casing and disposed out of direct alignment with the area of the light outlet opening, together with a reflector element, the reflecting surface of which is inclined generally upwardly and rearwardly and in which said surface is transversely flat throughout its entire length and includes a lower portion which is also flat longitudinally and an upper portion which is parabolically curved longitudinally.

The invention furthermore aims to provide a reflector element for a headlight, the reflecting surface of which is flat transversely throughout its entire length and which includes adjacent portions, one of which is flat longitudinally and the other of which is parabolically curved longitudinally.

As a further feature, the invention comprehends a headlight including a reflector which is relatively adjustable with respect to the source of illumination and which further includes exteriorly disposed means for effecting the angular adjustments and for locking the reflector in its angularly adjusted positions.

Other objects reside in the comparative simplicity of construction of the headlight, the economy with which it may be produced and the general efficiency derived therefrom.

With the above recited and other objects in view, reference is had to the following description and accompanying drawing, in which there is exhibited several examples or embodiments of the invention, while the claim defines the actual scope of the same.

In the drawings:

Figure 1 is a vertical longitudinal sectional view through a headlight constructed in accordance with the invention.

Figure 2 is a transverse sectional view therethrough taken approximately on the line indicated at 2—2 in Figure 1.

Figure 3:
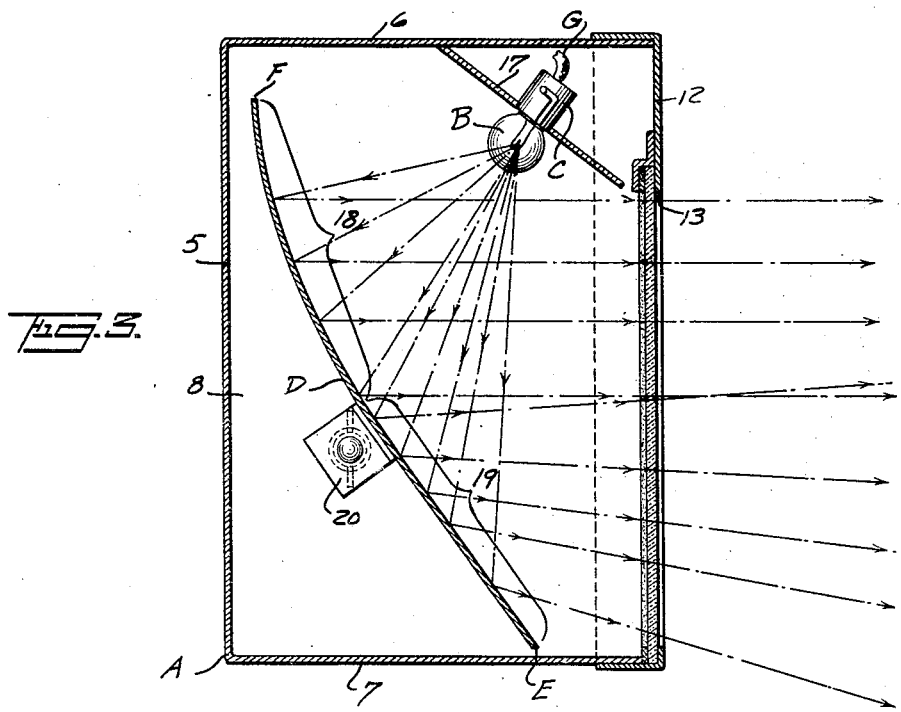
Figure 3 is a vertical longitudinal sectional view of a slightly modified adaptation of the invention.
Figure 4:
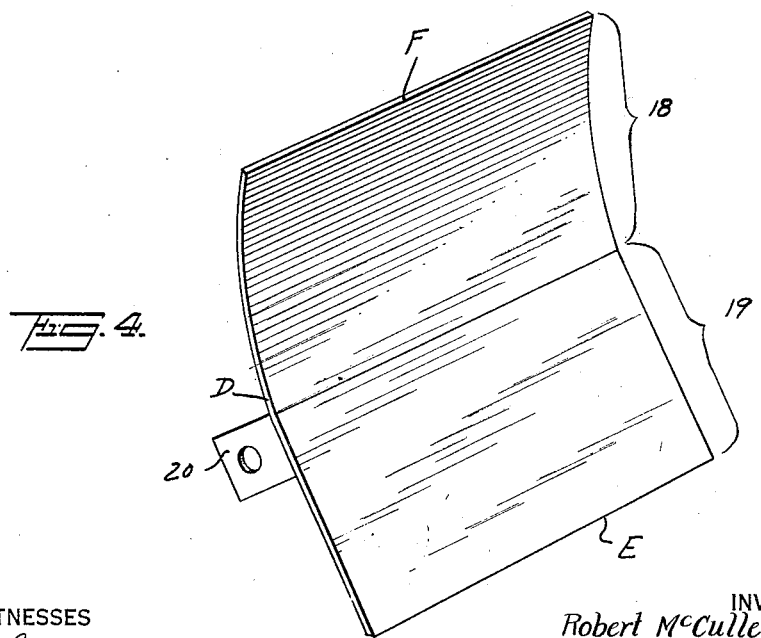
Figure 4 is a perspective view of the reflector element removed from the headlight casing.

Referring to the drawings by characters of reference, and particularly to the form of the invention illustrated in Figures 1 and 2, the headlight includes a casing designated generally by the reference character A, which casing comprises a rear wall 5, a top wall 6, a bottom wall 7, side walls 8 and a horizontal partition 9 spaced slightly below and parallel to the top wall 6. The partition 9 is provided at its forward edge with a depending flange 10 having an inwardly offset lower terminal 11. The casing further includes a removable cover 12 for the open front end, which cover is provided with a window opening 13 of slightly lesser area than the lower reflector compartment 14 of the casing. The cover 12 is preferably provided with a marginal flange 15 which telescopically fits over the forward end of the casing walls and which may be secured in place in any suitable manner. A transparent panel 16 of glass or its equivalent is arranged directly in rear of the cover 12 to completely seal the window opening 13 against the entrance of dust, dirt, moisture or other foreign matter. A source of illumination, such as one or more electric lamps B, is supported in the upper portion of the reflector compartment 14, preferably by a socket C, which extends into the space between the partition 9 and the upper wall 6. In practice, the lamp or lamps will be arranged so that their filaments will be above the lower edge of the window opening 13 whereby said filaments will not be directly visible through the window opening.

In the form of the invention illustrated in Figure 3, the casing A having the rear wall 5, upper wall 6, lower wall 7 and side walls 8, is not provided with the horizontal partition 9 but is formed with a transversely disposed forwardly and downwardly inclined supporting strip 17, the upper edge of which is attached to the under side of the upper wall 6 and the lower edge of which terminates approximately in line with the upper edge of the window opening 13 in the cover 12. In this instance, the source of illumination or electric lamp B is carried by a lamp socket C which is supported by the strip 17.

The reflecting element D, which is used in either form of casing, is preferably constructed of sheet metal and provided with a reflecting surface which is flat transversely throughout its entire length, that is, from its lower edge E to its upper edge F. The reflecting surface is divided into adjacent portions 18 and 19, the former being preferably disposed uppermost and parabolically curved longitudinally while the latter is disposed below the former portion and is flat longitudinally. The reflector element D is inclined generally in an upward and rearward direction and is supported within the reflector compartment 14 of the casing so as to permit of angular adjustments thereof or changes in its inclination for the purpose of obtaining the desired result. As illustrated, the reflector element carries medially of its opposite side edges, rearwardly projecting ears 20, one of which has extended therethrough a pivot 21 carried by a side wall of the casing and the other of which has secured thereto an outwardly projecting trunnion 22 which extends through an opening in the other side wall. The trunnion 22 is threaded to receive a binding or thumb nut 23 and its outer end carries a knurled head 24 which is keyed thereto. Under this construction and arrangement, it is obvious that the angular adjustment for the reflector element D may be effected from the exterior of the casing by first loosening the thumb nut 23 and employing the knurled head 24 as a means for changing the angularity of the reflector and then tightening the thumb nut to retain the same in adjusted position. It will also be observed that the removal of the cover 12 permits of ready access to the interior for the purpose of changing the lamps B or for gaining access to the wiring G which leads to the lamp sockets.

As indicated in Figure 1, the light rays from the lamp which are reflected by the curved surface 18 of the reflector element are projected substantially horizontal or parallel to the road surface while the light rays which are reflected by the flat surface 19 are diffused at an angle generally downward to flood the road surface immediately in advance of the vehicle. It will, of course, be understood that in addition the casing A will be supported in such a manner as to permit of proper tilting of the same to direct the light for proper illumination of the roadway in advance of the vehicle.

What is claimed is:

In a headlight, a casing having a light outlet opening in its front wall with a partition extending rearwardly from the front wall above the top of the light outlet opening, a lamp mounted in the partition, and a reflector within said casing at the rear of the lamp and the light outlet opening and below the lamp, said reflector having a reflecting surface flat transversely throughout its entire length and including upper and lower portions, the lower portion being longitudinally flat and the upper portion being parabolically curved longitudinally, the reflector being pivoted on a horizontal axis to permit of its adjustment relatively to the lamp and the outlet opening, the movement of the reflector being limited by engagement with the casing.

ROBERT McC. HALBACH.